United States Patent [19]

Severson

[11] 4,323,414
[45] Apr. 6, 1982

[54] SELF-SEALING CURING RIM FOR TUBELESS EARTHMOVER TIRE

[75] Inventor: Larry A. Severson, West Fargo, N. Dak.

[73] Assignee: Branick Mfg., Inc., Fargo, N. Dak.

[21] Appl. No.: 180,152

[22] Filed: Aug. 21, 1980

[51] Int. Cl.³ .............................................. B29H 17/00
[52] U.S. Cl. ..................................... 156/414; 156/96; 157/13; 301/23; 425/17; 425/36; 425/44
[58] Field of Search .............. 156/96, 394 FM, 394 R, 156/414; 425/15, 17, 21, 23, 24, 36, 44, 45; 157/1.1, 1.35, 13; 301/10 R, 11 CD, 23

[56] References Cited

U.S. PATENT DOCUMENTS

| | | | |
|---|---|---|---|
| 2,480,578 | 8/1949 | Hodges | 525/17 |
| 2,871,518 | 2/1959 | Branick | 425/17 X |
| 3,114,937 | 12/1963 | Branick | 425/17 X |
| 3,133,317 | 5/1964 | Branick | 425/17 X |
| 3,195,179 | 7/1965 | Laube | 525/280 R |
| 3,313,328 | 4/1967 | Clapp | 157/13 |
| 3,341,898 | 9/1967 | Branick | 425/17 X |
| 3,593,764 | 7/1971 | Smith | 525/17 |
| 3,614,969 | 10/1971 | Breiner | 525/17 |
| 3,674,067 | 7/1972 | Cooper | 157/16 |
| 3,910,337 | 10/1975 | Pelletier | 157/13 |
| 4,013,499 | 3/1977 | Benigni | 156/394 |
| 4,051,881 | 10/1977 | Peterson | 425/17 X |
| 4,129,474 | 12/1978 | Martin | 156/96 |

OTHER PUBLICATIONS

Ohio Machine Company, Inc., "Tubeless Adjustable Self-Sealing Curing Rim" Brochure, 1979.

*Primary Examiner*—John E. Kittle
*Attorney, Agent, or Firm*—Merchant, Gould, Smith, Edell, Welter & Schmidt

[57] ABSTRACT

A curing rim for a vehicle tire is shown. A flanged first sleeve (13) is adapted to seal the bottom bead of a large tubeless tire (10). A flanged sealing sleeve (14), having a cylindrical inner surface (24) with an O-ring seal (26) carried thereby, is adapted to seal the opposite bead of the tire. A cylindrical locking sleeve (15) is telescoped through the sealing sleeve (14) and is sealingly engaged at its bottom end to the first sleeve (13). The upper end of locking sleeve (15) is provided with a stop flange (31). The sealing sleeve (14) maintains an air-tight seal with the bead of the tire and also seals against the locking sleeve (15) as the tire is inflated and moves upwardly along the locking sleeve (15) until blocked by the stop flange (31).

14 Claims, 4 Drawing Figures

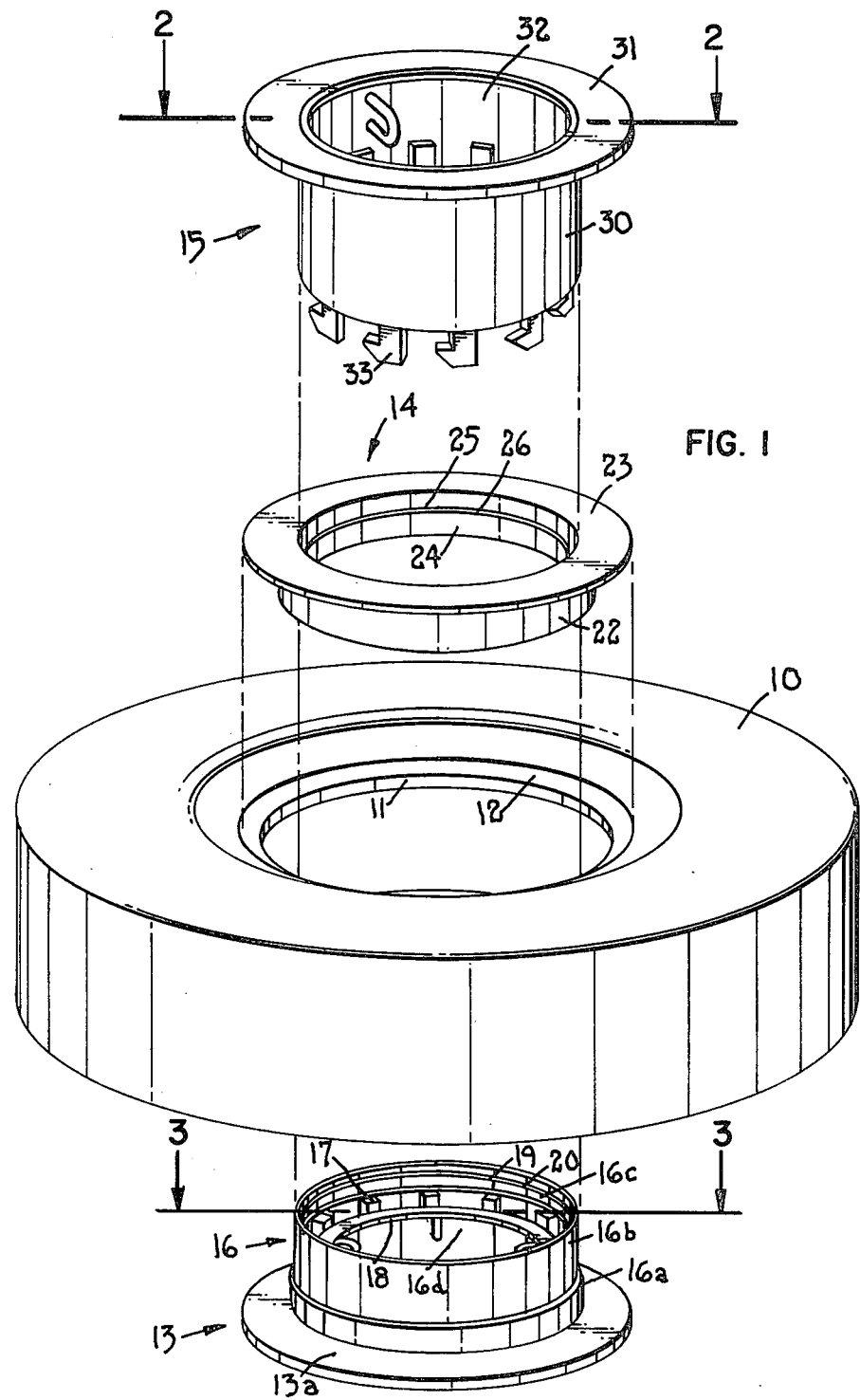

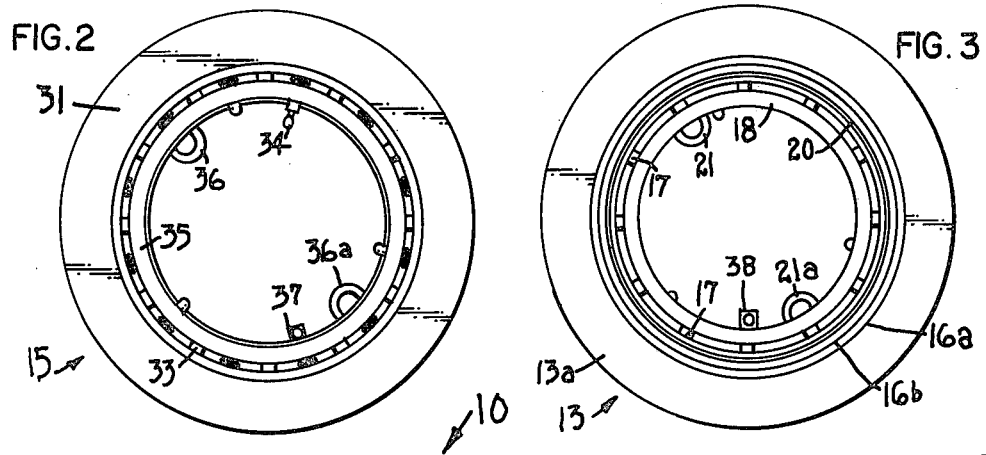
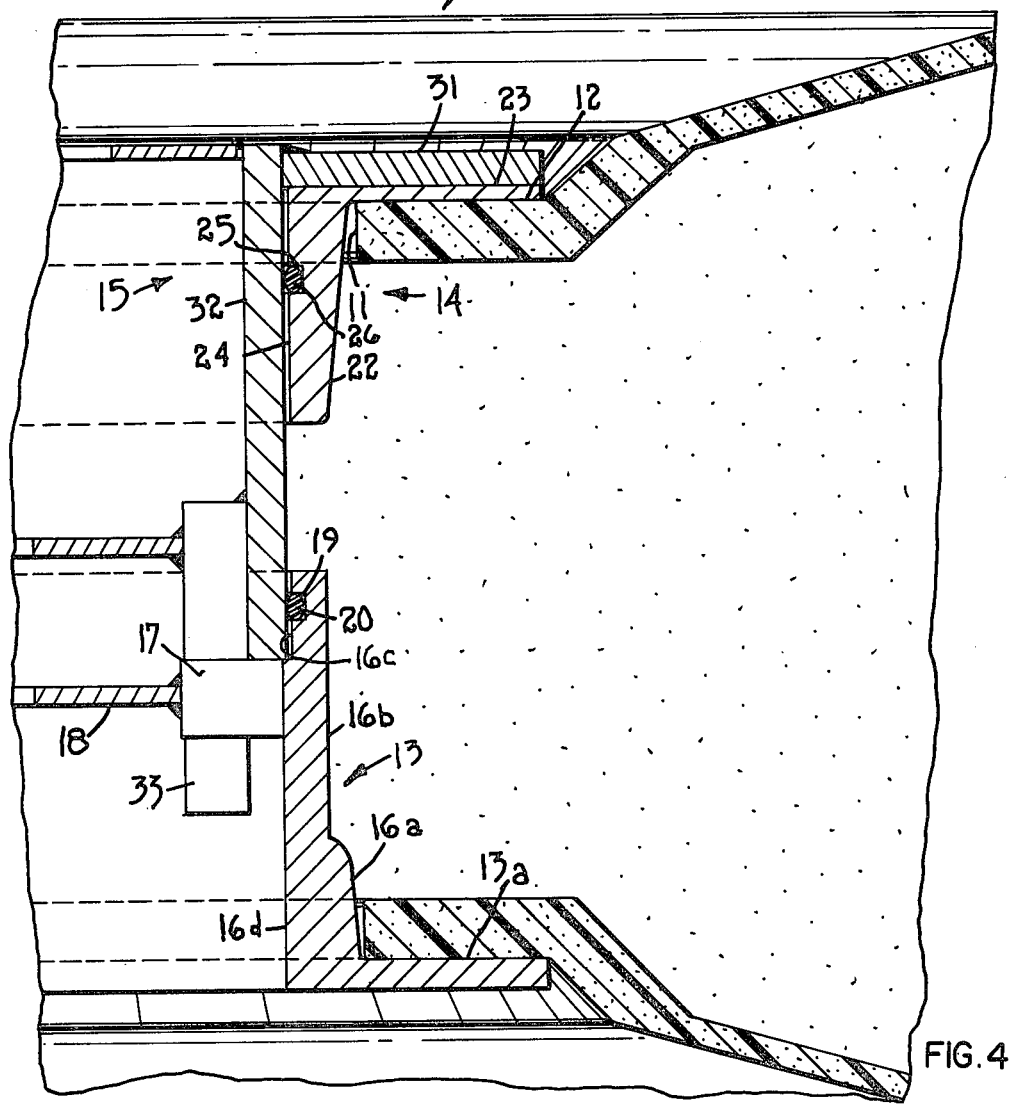

SELF-SEALING CURING RIM FOR TUBELESS EARTHMOVER TIRE

TECHNICAL FIELD

This invention relates generally to apparatus for supporting a vehicle tire during a curing operation and more particularly relates to self-sealing curing rim apparatus for large tubeless tires.

BACKGROUND OF THE INVENTION

During a curing operation, the vehicle tire is typically mounted on a curing rim which may consist of two or more sections which are connected together to encompass the tire during the curing operation. After the tire is mounted on the curing rim, it is necessary to initially expand or inflate the tire into a sealing relationship with the curing rim so that full pressure can be applied to the tire to maintain it in position during a curing operation. Because the tire is not initially sealed to the rim, it has been necessary in the past to take special steps or utilize additional sealing apparatus to achieve the initial seal. Surge tanks have been used to inflate the tire very rapidly. Other systems have employed sealing bands or inner tubes. A system employing an inner tube is disclosed in the Peterson U.S. Pat. No. 4,051,881 issued Oct. 4, 1977.

BRIEF SUMMARY OF THE INVENTION

The curing rim of the present invention includes apparatus for sealing the tire at the bead while the tire is inflated, and requires no inner tubes, sealing bands or surge tanks to accomplish the initial sealing. The tire can be inflated by a standard quarter inch air line. In particular, the curing rim includes a two-part body having a tire bead engaging portion at one end, a cylindrical central portion which extends through the tire, and a stop flange at the opposite, upper end. A flanged sealing sleeve is telescopically mounted around the cylindrical portion and includes a tire bead engaging portion to maintain an air-tight seal with the bead of the tire as the tire is inflated. The sealing sleeve also has a cylindrical inner wall portion which carries an O-ring seal to sealingly engage the cylindrical wall portion of the body to prevent air leaking between them as the tire is inflated. The sealing sleeve and the body initially cooperate to seal the top and bottom tire beads, and as the tire is inflated, the sealing sleeve is carried upwardly with the top tire bead and eventually seats against the stop flange on the body where it continues to maintain an air-tight seal while the tire is being fully inflated.

BRIEF DESCRIPTION OF THE DRAWINGS

FIG. 1 is an exploded perspective view of the present invention and a vehicle tire to be mounted on the self-sealing curing rim;

FIG. 2 is a top plan view of the locking sleeve shown in FIG. 1;

FIG. 3 is a top plan view of the first sleeve shown in FIG. 1; and

FIG. 4 is an enlarged sectional view of the curing rim mounted on an inflated vehicle tire, portions thereof being broken away.

DESCRIPTION OF THE PREFERRED EMBODIMENT

Referring now to the drawings, wherein like reference numerals are used throughout the several views to indicate like elements of the invention, there is disclosed a typical large tubeless tire 10 of the type used for earthmovers or the like. Tire 10 has a bead 11 on each side and an adjoining side wall portion 12. The curing rim of the present invention comprises three major parts, a first, flanged sleeve or sleeve member 13, a flanged sealing sleeve or sleeve member 14, and a locking sleeve or sleeve member 15. First sleeve 13 has a generally tubular body 16 with an annular, outwardly extending flange 13a attached to a first, bottom end perpendicular thereto. Tubular body 16 includes a lower body portion 16a which is cylindrical in shape and which has an outside diameter corresponding to the diameter of the bottom bead 11 of tire 10. Tubular body 16 also includes an upper body portion 16b of slightly smaller outside diameter which includes a cylindrical inner wall portion 16c at the top end. Wall portion 16c is of larger diameter than the remaining lower, inner portion 16d. A plurality of metal blocks or lugs 17 are welded to wall portion 16d at spaced intervals around its periphery, and a flat, annular metal ring 18 is welded to the blocks 17. An annular groove 19 is formed in cylindrical inner wall portion 16c, the groove lying in a plane perpendicular to the axis of tubular body 16; and an O-ring 20 is mounted in groove 19.

It can be seen from FIG. 1 that when tire 10 is placed over first sleeve 13, the bottom bead 11 engages lower body portion 16a and the inner side wall portion 12 engages flange 13a to provide an air-tight seal at that bead of the tire.

Flanged sealing sleeve 14 includes a tubular body portion 22 having an outslide diameter corresponding to the diameter of bead 11 so that it snugly engages the bead when inserted into the tire 10. Attached to the top end of tubular body portion 22 is an annular, outwardly extending flange 23, lying in a plane perpendicular to the axis of tubular portion 22. Flange 23 is designed to engage side wall portion 12 to aid in sealing the tire as it is inflated. Tubular body portion 22 of sealing sleeve 14 also has a cylindrical inner wall 24 of the same diameter as cylindrical inner wall 16c of first sleeve 13. An annular groove 25 is formed in cylindrical inner wall 24 and lies in a plane perpendicular to the axis of tubular body portion 22; and an O-ring 26 is mounted in groove 25. Sealing sleeve 14 can be inserted into the top of tire 10 as shown to provide an air-tight seal between it and the tire bead 11.

Locking sleeve 15 includes a tubular body portion 30 having an outside diameter corresponding to the inside diameters of cylindrical inner wall 24 and cylindrical inner wall 16c. An annular stop flange 31 is mounted at the top, first end of locking sleeve 15, and lies in a plane perpendicular to the axis of tubular body portion 30. Mounted to the cylindrical inner wall 32 of locking sleeve 15 at spaced intervals are a plurality of downwardly extending hooks 33, equal in number to the lugs 17 of first sleeve 13. An air inlet valve assembly 34 is mounted in tubular body portion 30 to permit an operator to inject compressed air into the tire 10. A metal ring 35, corresponding in size to metal ring 18, is welded to the ring of hooks 33 within the tubular body portion 30. A pair of closing loops 36, 36a are welded to the inner edge of metal ring 35 and a corresponding pair of closing loops 21, 21a are welded to the inner edge of metal ring 18. Corresponding metal tabs 37 and 38 are also welded to the inner edges of rings 35 and 18 respectively, each having a hole formed therein.

When it is desired to mount a tire 10 on the self-sealing curing rim assembly of the present invention, the first sleeve 13 is normally placed with the flanged first end 13a on some wood blocks to elevate it from the floor. In this position, which is shown in FIG. 1, the tubular body 16 extends upwardly, and the tire 10 is then placed over the tubular body 16 so that the bottom bead 11 seals against the lower body portion 16a and the flange 13a supports the lower side wall portion 12. The O-ring 20 is mounted in groove 19. The sealing sleeve 14 is then telescoped over the locking sleeve 15 so that the O-ring 26 in groove 25 sealingly engages tubular body portion 30 which is machined to tightly fit against the O-ring. After the seaing sleeve 14 has been inserted over the locking sleeve 15 with the flanged end 23 facing the stop flange 31, the combined unit is lowered into the tire 10 so that the tubular body portion 22 sealingly engages the upper bead 11 and flange 23 supports side wall portion 12, and so that the hooks 33 extend between the lugs 17. Although not shown in detail on the drawings, the respective hooks 33 and lugs 17 should be arranged so that the same hook will always be matched with the same lug. After insertion, the locking sleeve 25 is rotated so that the hooks extend beneath the lugs 17 to prevent axial separation of the locking sleeve 15 from first sleeve 13. Although not shown on the drawings, a rod-like tool can be used in cooperation with the closing loops 36, 36a and 21, 21a to effect relative rotation between the two sleeves, and after the sleeves are properly aligned, a pin can be inserted through the holes in matching tabs 37, 38 to lock the sleeves in place. If not already in place, the sealing sleeve 14 should be pushed down tightly against the tire to seal the tire bead. The tire can then be inflated through the air inlet 34 with a standard one-quarter inch compressed air line. The bottom bead is initially sealed by first sleeve 13, and the top bead is initially sealed by sealing sleeve 14 so that air does not leak between the sleeves and the tire. At the same time, the bottom end of tubular body portion 30 is telescoped into the cylindrical inner wall 16c of first sleeve 13, and the gap between them is sealed by O-ring 20. The space between sealing sleeve 14 and locking sleeve 15 is sealed by the O-ring 26. As air is inserted into the tire, the tire expands upwardly and carries with it sealing sleeve 14 which moves upwardly along wall portion 30 until flange 23 engages stop flange 31, at which point the sealing sleeve 14 is blocked from further movement and the tire can be completedly inflated.

The assembled curing rim with tire mounted thereon, can then be handled in normal fashion throughout the treating process. After the treatment is completed, the tire 10 is deflated which permits the sealing sleeve 14 to be forced downwardly until locking sleeve 15 can be rotated to release the hooks 33 from lugs 17.

Although not shown on the drawings, it should be noted that one curing rim assembly can be used for several widths of tires by using one or more spacer rings between first sleeve 13 and locking sleeve 15.

The present invention eliminates the need for sealing bands, surge tanks or the like because the sealing sleeve 14 maintains an air-tight seal as the tire is inflated and moves with the expanding tire until blocked by the stop member 31 of the locking sleeve 15. At the same time, means are provided to seal between the three sleeves so that air cannot leak from the tire as it is being inflated.

What is claimed is:

1. A rim for supporting a vehicle tire during a curing operation, comprising:
   (a) a first sleeve, having a flanged first end and a second end, adapted to seal the bead of a tire;
   (b) a flanged sealing sleeve adpated to seal the bead of the tire opposite from the first sleeve, said sealing sleeve having a cylindrical inner surface with an annular groove formed therein;
   (c) a locking sleeve having first and second ends, comprising a cylindrical outer wall portion and an annular stop flange at said first end, telescoped within said sealing sleeve to permit relative axial movement therebetween;
   (d) means including sealing means for securing together said first and locking sleeves at their second ends for support between them of a vehicle tire during a curing operation;
   (e) a gasket member in said groove to engage said cylindrical outer wall portion; and
   (f) an air inlet in said rim, said sealing sleeve being constructed and arranged to maintain an air-tight seal with the bead of the tire as the tire is inflated and to move therewith along said outer wall portion of said locking sleeve until blocked by said stop flange of said locking sleeve.

2. A rim according to claim 1 wherein said first sleeve comprises a cylindrical inner wall portion at said second end, wherein said second end of said locking sleeve is telescoped within said cylindrical inner wall portion of said first sleeve, and wherein said sealing means is mounted between said telescoped first and locking sleeves.

3. A rim for supporting a vehicle tire during a curing operation, comprising:
   (a) a first flanged sleeve adapted to engage one side and the bead of a tire;
   (b) a flanged sealing sleeve adapted to engage the side and bead of the tire opposite from the first sleeve, said sealing sleeve having a cylindrical inner surface;
   (c) a locking sleeve having opposite ends, comprising a cylindrical outer wall portion and an annular stop flange at one end, telescoped within said sealing sleeve to permit relative axial movement therebetween;
   (d) means for releasably holding said first sleeve and said locking sleeve in an oppositely disposed relationship for support between them of a vehicle tire during a curing operation;
   (e) means for providing a seal between said first sleeve and said locking sleeve; and
   (f) means for providing a seal between said locking sleeve and said sealing sleeve, and an air inlet in said rim, said sealing sleeve being constructed and arranged to maintain an air-tight seal as the tire is inflated and to move therewith until blocked by said stop flange of said locking sleeve.

4. A rim according to claim 3 wherein said first sleeve has opposite ends and comprises a cylindrical inner wall portion at one end and a flange at the other end, wherein an end of said locking sleeve opposite said stop flange is telescoped within said cylindrical inner wall portion of said first sleeve, and wherein said sealing means is mounted between said telescoped first and locking sleeves.

5. A rim according to claim 4 wherein said sealing means comprises an annular groove formed in one of said cylindrical wall portions of said first and locking sleeves, and an O-ring in said groove.

6. A rim according to claim 4 wherein said groove is formed in said first sleeve.

7. A rim according to claim 3 wherein said sealing sleeve has opposite ends with an annular flange at one end, and wherein said means for providing a seal between said locking sleeve and said sealing sleeve comprises an annular groove formed in one of said cylindrical wall portions of said locking sleeve and said sealing sleeve, and an O-ring in said groove.

8. A rim according to claim 7 wherein said groove is formed in said sealing sleeve.

9. A rim for supporting a vehicle tire during a curing operation, comprising:
(a) a first sealing sleeve member adpated to seal a tire at the bead when the tire is inflated;
(b) a locking sleeve member having opposite ends, comprising a cylindrical outer wall portion and a stop member at one end;
(c) a second sealing sleeve member adapted to seal a tire at the bead opposite from the first sealing sleeve member, said second sealing sleeve member having a cylindrical inner surface;
(d) means for releasably holding said first sealing sleeve member and said locking sleeve member in an oppositely disposed relationship with said locking sleeve member telescoped through said second sealing sleeve member, for support between them of a vehicle tire during a curing operation;
(e) means sealing between said first sealing sleeve member and said locking sleeve member; and
(f) an air inlet in said rim, and means sealing between said locking sleeve member and said second sealing sleeve member while permitting axial relative movement therebetween as the tire is inflated so that, the second sealing sleeve member maintains an air-tight seal as the tire is inflated and moves with the expanding tire until blocked by said stop member of said locking sleeve member.

10. A rim according to claim 9 wherein said first sealing sleeve member has opposite ends and comprises a cylindrical inner wall portion at one end with an annular groove formed therein, and a flange at the other end, wherein an end of said locking sleeve member opposite said stop member is telescoped within said cylindrical inner wall portion of said first sealing sleeve member, and wherein said sealing means is an O-ring mounted in said groove to sealingly engage said cylindrical outer wall portion of said locking sleeve member.

11. A rim according to claim 9 wherein said second sealing sleeve member has opposite ends with an annular flange at one end, and wherein said means for providing a seal between said locking sleeve member and said second sealing sleeve member comprises an annular groove formed in said cylindrical inner surface of said second sealing sleeve member, and wherein said sealing means is an O-ring in said groove to sealingly engage said cylindrical outer wall portion of said locking sleeve member.

12. A curing rim comprising a body having a flange-like tire bead engaging member formed integrally therewith at one end, a central portion adapted to extend through the tire, and a flange-like stop member formed integrally therewith at an opposite end; a moveable sealing sleeve surrounding said central portion; and an air inlet in said rim to inflate the tire to expand the beads thereof toward said flange-like members; said sealing sleeve having a tire bead engaging portion to maintain an air-tight seal with the bead of the tire as the tire is inflated and having associated therewith separate sealing means for sealingly engaging said central portion to prevent air leaking therebetween as said sealing sleeve moves along said central portion with the moving tire bead until blocked by said stop member as the tire is inflated.

13. A rim for supporting a vehicle tire during a curing operation, the rim comprising:
(a) a first sealing member adapted to engage the tire at a first tire bead;
(b) a locking member, and means for releasably holding said first sealing member and said locking member in an oppositely disposed relationship for support between them of a vehicle tire during a curing operation;
(c) a second sealing member, adapted to engage the tire at a second tire bead, telescopically mounted over said locking member for movement therealong as the tire is inflated, said locking means having stop flange means to limit said movement;
(d) sealing means to provide a seal between said second sealing member and said locking member; and
(e) conduit means for introducing inflating air into the tire, said rim being constructed and arranged so that said when said locking member is in telescopic engagement with said second sealing member and secured by said securing means to said first sealing member and inflating air is introduced into the tire through said conduit means, said first and second sealing members are brought into, or maintained in, sealing relationship with the respective tire beads, and said second sealing member can move with respect to said locking member as the tire is inflated until blocked by said stop flange means.

14. A rim according to claim 13, in which said first sealing member is a sleeve having a flanged first end and a second end; said second sealing member is a sleeve having a cylindrical inner surface with an annular groove formed therein; said locking member is a sleeve having first and second ends, comprising a cylindrical outer wall portion and an annular stop flange at said first end, telescoped within said second sealing member to permit relative axial movement therebetween, said securing means securing together said first sealing member and said locking member at their second ends for support between them of a vehicle tire during a curing operation; and said groove has a gasket therein to engage said cylindrical outer wall portion.

* * * * *

UNITED STATES PATENT AND TRADEMARK OFFICE
CERTIFICATE OF CORRECTION

PATENT NO. : 4,323,414
DATED : April 6, 1982
INVENTOR(S) : Larry A. Severson

It is certified that error appears in the above—identified patent and that said Letters Patent is hereby corrected as shown below:

Column 3, line 14, "seaing" should be --sealing--.

Column 4, line 3, "adpated" should be --adapted--.

Column 5, line 14, "adpated" should be --adapted--.

Column 6, line 35, "said when said" should be --when said--.

Signed and Sealed this

Twentieth Day of July 1982

[SEAL]

Attest:

GERALD J. MOSSINGHOFF

*Attesting Officer*   *Commissioner of Patents and Trademarks*